(12) United States Patent
Uhland

(10) Patent No.: US 8,282,304 B2
(45) Date of Patent: Oct. 9, 2012

(54) TRANSMISSIVE FISHING SWIVEL

(75) Inventor: Rusty Uhland, St. Augustine, FL (US)

(73) Assignee: Aquateko International, LLC, Ponte Verda Beach, FL (US)

( * ) Notice: Subject to any disclaimer, the term of this patent is extended or adjusted under 35 U.S.C. 154(b) by 193 days.

(21) Appl. No.: 12/432,822

(22) Filed: Apr. 30, 2009

(65) Prior Publication Data
US 2010/0275501 A1    Nov. 4, 2010

(51) Int. Cl.
*F16D 3/00*    (2006.01)
(52) U.S. Cl. ......................... 403/78; 43/42.19
(58) Field of Classification Search .............. 403/72, 403/78, 161; 43/43.1, 43.15, 43.16, 44.87; 24/908; *A01K 91/03, 91/04, 91/047*
See application file for complete search history.

(56) References Cited

U.S. PATENT DOCUMENTS

| | | | | |
|---|---|---|---|---|
| 3,762,092 A | * | 10/1973 | Bercz et al. | ........... 43/17.6 |
| 4,064,604 A | * | 12/1977 | Hartman | ............ 24/601.1 |
| 6,457,896 B1 | * | 10/2002 | deDoes | .............. 403/2 |
| 6,481,149 B1 | * | 11/2002 | Hall et al. | ........... 43/43.16 |
| 6,796,080 B1 | * | 9/2004 | Mathews et al. | ........ 43/42.13 |
| 2007/0261291 A1 | * | 11/2007 | Magazzu | ........... 43/43.16 |
| 2008/0060252 A1 | * | 3/2008 | Doss | ................ 43/43.1 |
| 2010/0205849 A1 | * | 8/2010 | Choi | ............... 43/42.35 |

OTHER PUBLICATIONS

Google Search Results For "Aquateko invisaswivel", Date range: Jan. 1, 2008-Jan. 1, 2010, Searched Mar. 13, 2012, https://www.google.com/search?q=aquateko+invisaswivel&hl=en&biw=1083&bih=919&sa=X&ei=z6hfT97pNIHv0gHaouTDB.*

* cited by examiner

*Primary Examiner* — Victor MacArthur
*Assistant Examiner* — Daniel Wiley
(74) *Attorney, Agent, or Firm* — Mark Young, P.A.

(57) ABSTRACT

A fishing swivel, such as a barrel, snap or three-way swivel, is comprised of a plastic material that exhibits a high degree of transparency in water, density greater than that of water, and adequate rigidity to withstand appreciable deformation while loads are exerted. Materials such as Polyvinylidene Fluoride (PVDF) and Nylon 6 (Polyamide 6) copolymers with a refractive index less than 1.55, a luminous transmittance greater than 75%, a specific gravity greater than 1.0, an ultimate tensile strength greater than 1,000 psi, and a tensile elastic modulus greater than 10,000 psi are preferred.

19 Claims, 7 Drawing Sheets

TRANSMISSIVE FISHING SWIVEL

FIELD OF THE INVENTION

This invention generally relates to fishing, and more particularly, to a transparent or translucent fishing swivel with an index of refraction close to that of water.

BACKGROUND

A fishing swivel is a device consisting of rotatable parts (i.e., rings with stems) connected to a pivoting joint. The device is usually made of metal, and the pivoting joint is usually ball- or barrel-shaped. The line from a rod and reel is tied to one ring, and a length of fishing line, often terminated by a hook, lure or sinker, is tied to another ring, usually the opposite ring. Snap swivels have a safety-pin like clip linked to one or more of the rings. Three-way swivels provide a point of connection for an additional lure or length of line, and are essential for certain line and hook setups. Swivels come in sizes ranging from a few millimeters to several centimeters, and are traditionally composed of metal, and may be flat black or brass in color. The main purpose of the swivel is to allow the line to untwist during line retrieval, preventing undesirable tangling.

While conventional swivels have proven effective in reducing twisting and tangling, they suffer a major drawback. The visible presence of the swivel has been said to compromise the effectiveness of transparent lines used by anglers. While a wide range of sophisticated transparent fishing lines have emerged, swivels have remained substantially static and opaque in design. The great variety of prior proposed swivel improvements have not successfully replaced the conventional metal opaque swivel construction. As a result, a critical aspect of hooking a fish, i.e., attracting with a natural or artificial bait and deceiving the fish into swallowing an associated fishing hook, remains a challenge. Swivel visibility remains to the advantage of the fish. Swivel visibility compromises the effectiveness of transparent lines. Accordingly, it is desirable that a swivel exhibit the requisite mechanical properties to provide a strong pivoting coupling, but also exhibit the desirable characteristic of transparency so that the near invisibility of modern fishing line is not compromised.

What is needed is a fishing swivel that is difficult to detect in water. The invention is directed to overcoming one or more of the problems and solving one or more of the needs as set forth above.

SUMMARY OF THE INVENTION

To solve one or more of the problems set forth above, in an exemplary implementation of the invention, a transmissive (i.e., translucent, transparent or substantially transparent) plastic fishing swivel is provided. The fishing swivel may be configured as any type of swivel, such as, but not limited to, a barrel, snap or three-way swivel. It is comprised of a plastic material that exhibits a high degree of transparency in water, density greater than that of water, an ultimate tensile strength sufficient for a small embodiment to withstand the loads exerted during fishing, and adequate rigidity to withstand appreciable deformation while loads are exerted. Materials such as Polyvinyldene Fluoride (PVDF) and copolymers and derivatives with a refractive index less than 1.55, a specific gravity greater than 1.0, an ultimate tensile strength greater than 1,000 psi, and a tensile elastic modulus greater than 10,000 psi are preferred.

An exemplary fishing swivel according to principles of the invention includes a swivel body and a pin assembly. The swivel body includes a first neck having a distal and proximal end, a collar, a means for attaching the collar to the proximal end of the first neck, and a means for attaching a line to the distal end of the first neck. The pin assembly includes a second neck having a distal and proximal end, a head at the proximal end of the second neck, and a means for attaching a line to the distal end of the second neck. The second neck is rotatably engaged by the collar. The fishing swivel consists of a substantially transparent material when the material is immersed in water. The substantially transparent material being a dyed material, a transparent material, or a translucent material. The collar has a central aperture with a first diameter. The head has a head diameter greater than the first diameter. The second neck has a second diameter less than the first diameter. The means for attaching the collar to the proximal end of the first neck includes at least one projection extending from the neck to the collar. The means for attaching a line to the distal end of the first neck and for attaching a line to the distal end of the second neck each include an eyelet or aperture formed in the distal end of the neck. In each case, the eyelet or aperture may have finished (e.g., beveled or filleted) edges.

In other embodiments, a fishing swivel according to principles of the invention includes a swivel body and a pin assembly rotatably coupled to the body. The fishing swivel consists of a substantially transparent material. The material has a refractive index less than 1.55, a specific gravity greater than 1.0, an ultimate tensile strength greater than 1,000 psi, a tensile elastic modulus greater than 10,000 psi. The material may comprise Polyvinylidene Fluoride, Nylon, Nylon 6, Nylon 6,6, Nylon 9, Nylon 5, Nylon 10, Copolyamide, Polycarbonate, Polyethylene, and Fluoropolymer. The material is preferably injection molded and then rapidly cooled to achieve the desired optical properties.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

Figure 13:
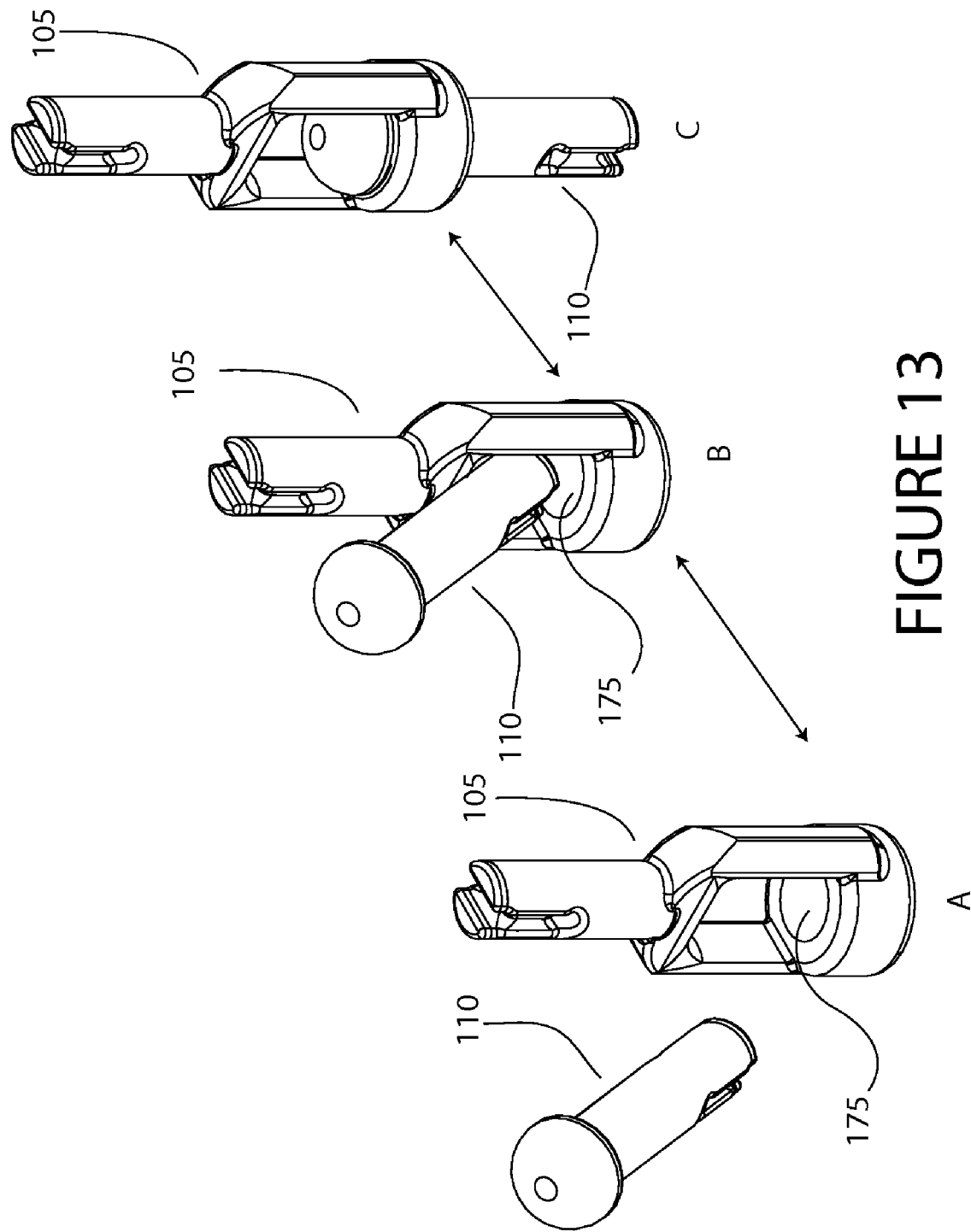
FIG. 13 is a schematic illustrating assembly of an exemplary transparent swivel assembly according to principles of the invention.
Figure 14:
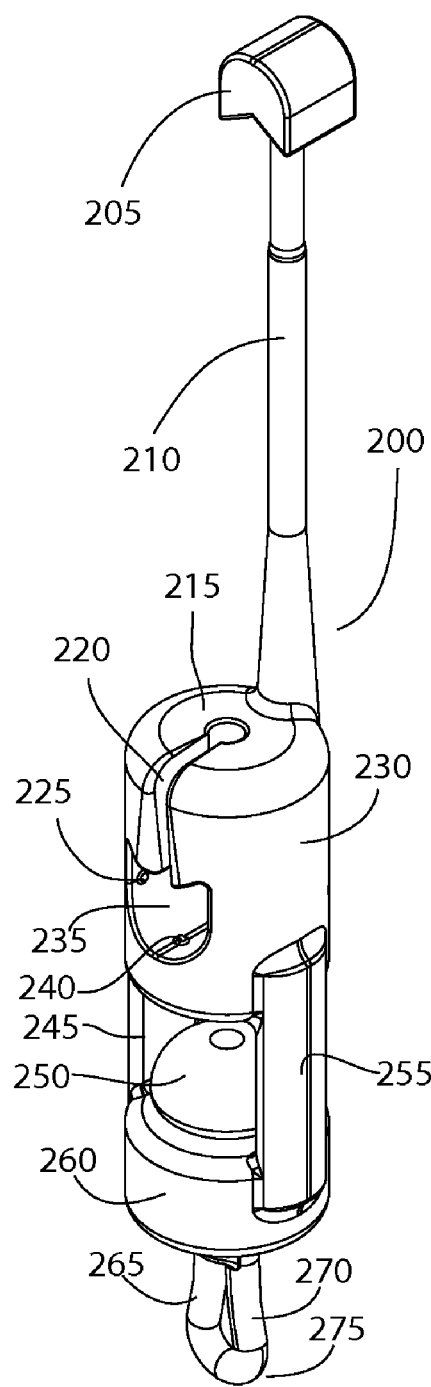
FIG. 14 shows a perspective view an exemplary transparent snap swivel according to principles of the invention.
Figure 15:
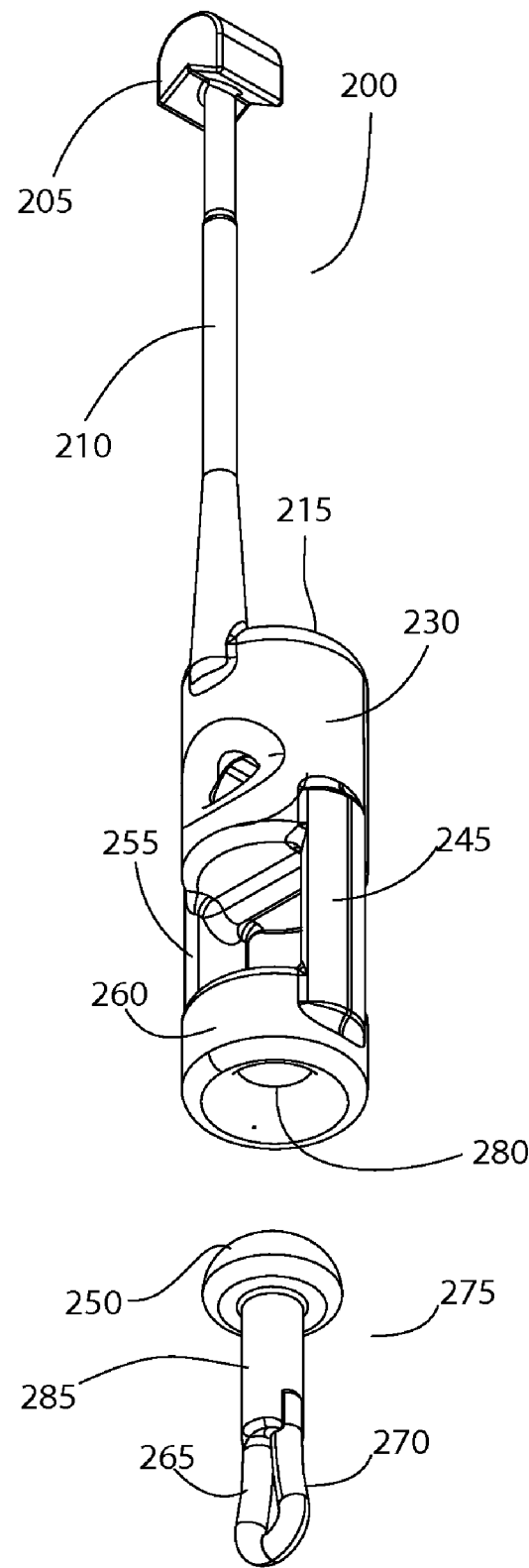
FIG. 15 shows an exploded view of an exemplary transparent snap swivel according to principles of the invention.
Figure 16:
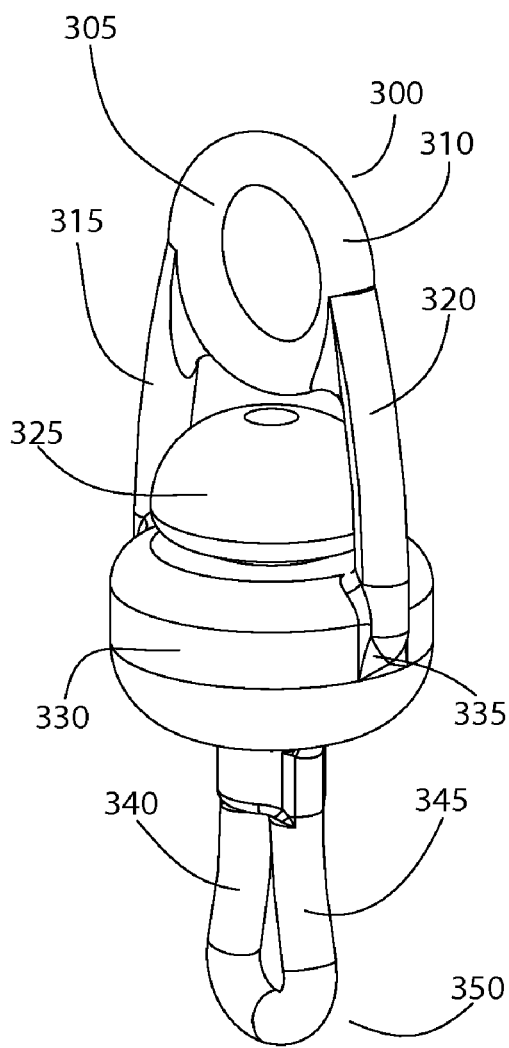
FIG. 16 shows a perspective view an exemplary transparent barrel swivel according to principles of the invention.
Figure 17:
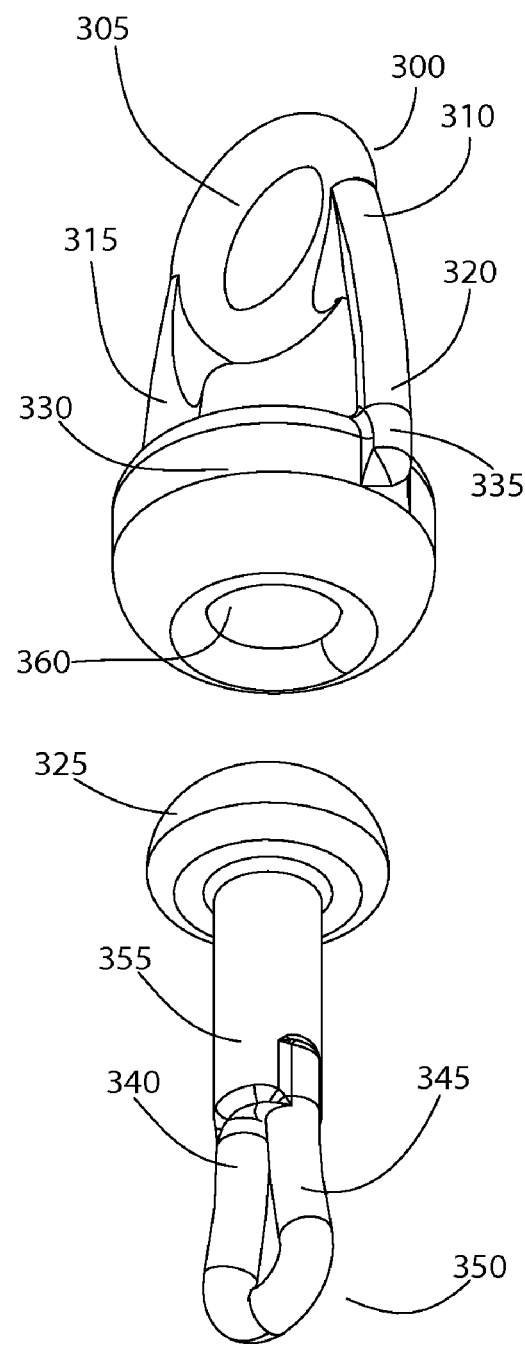
FIG. 17 shows an exploded view of an exemplary transparent barrel swivel according to principles of the invention.
Figure 18:
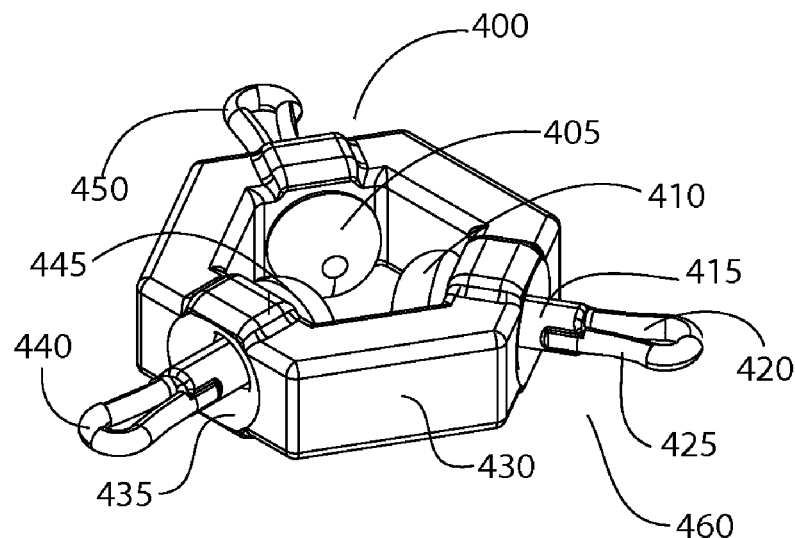
FIG. 18 shows a perspective view an exemplary transparent three-way swivel according to principles of the invention.
Figure 19:
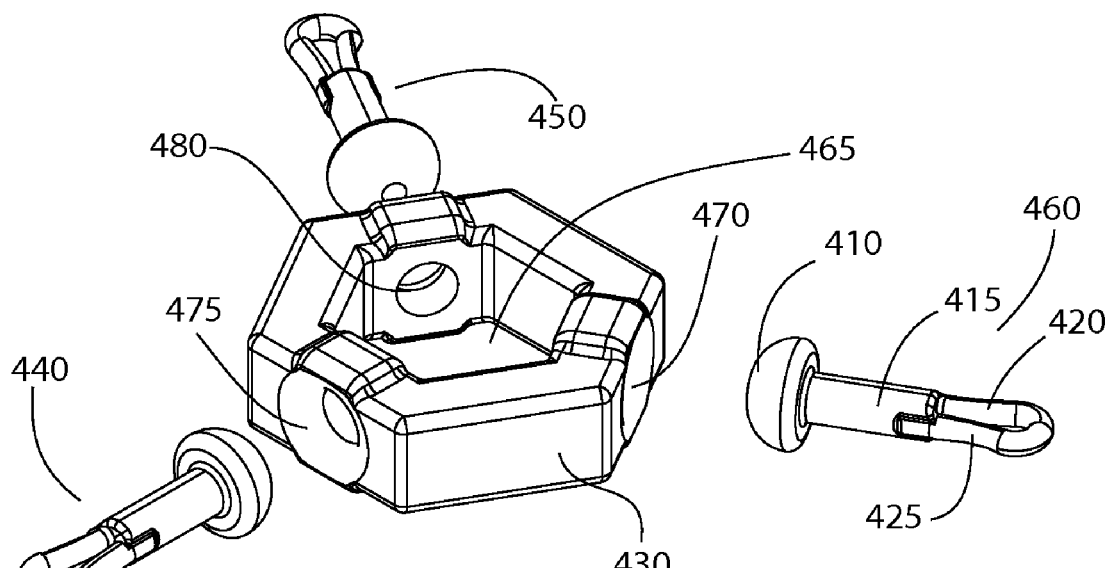
FIG. 19 shows an exploded view of an exemplary transparent three-way swivel according to principles of the invention.

Referring to the Figures, in which like parts are indicated with the same reference numerals, various views of exemplary transparent swivels according to principles of the invention are shown. FIGS. 1 through 13 illustrate a preferred embodiment of a transparent swivel according to principles of the invention. FIGS. 14 and 15 illustrate an exemplary snap swivel. FIGS. 16 and 17 illustrate an exemplary barrel swivel. FIGS. 18 and 19 illustrate an exemplary three-way swivel. The components comprising each swivel will first be described, after which the transparent materials comprising the swivels and methods of manufacture will be addressed.

Referring to FIGS. 1 through 4, various views of an exemplary swivel assembly 100 in accordance with principles of the invention are provided. The assembly generally includes a pin assembly 110 rotatably engaged by and mated with a shackle assembly 105 (also referred to as a swivel body). The pin assembly 110 may rotate 360°, clockwise and counterclockwise, relative to the shackle assembly 105.

Fishing line may be connected at the distal end 120, 135 (i.e., the outward most end) of the shackle 105 and pin 110, which are at opposite ends of the swivel 100. Each of the shackle 105 and pin 110 assemblies includes a neck 160, 165 terminating in a line eyelet 115, 140 and guide 125, 130, at the distal end 120, 135 (i.e., the outward most end). Each eyelet is a small aperture extending through the neck, preferably with finished (i.e., beveled or filleted) edges. A length of fishing line may be threaded through each eyelet 115, 140 and tied or otherwise secured around the corresponding guide 125, 130. The guide 125, 130 is a curved channel that distributes stresses and prevents the line from slipping off.

Figure 1:
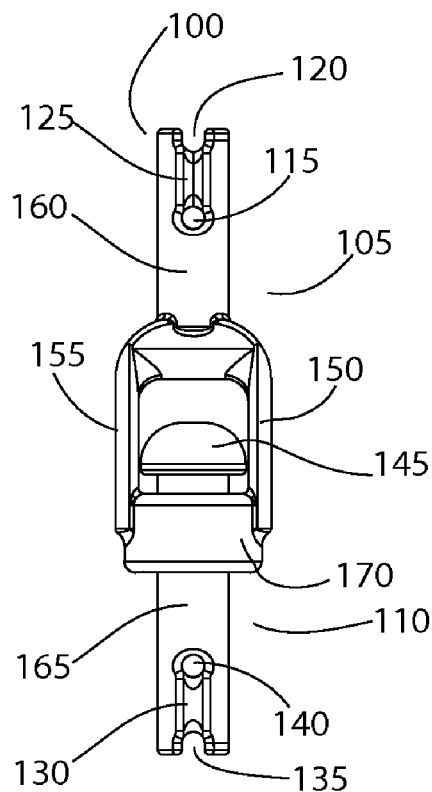
FIG. 1 shows a front view an exemplary transparent swivel assembly according to principles of the invention.
Figure 2:
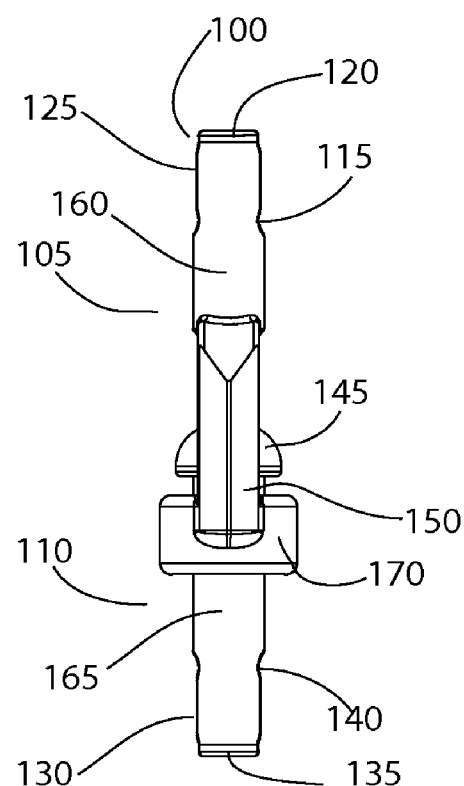
FIG. 2 shows a side view an exemplary transparent swivel assembly according to principles of the invention.
Figure 3:
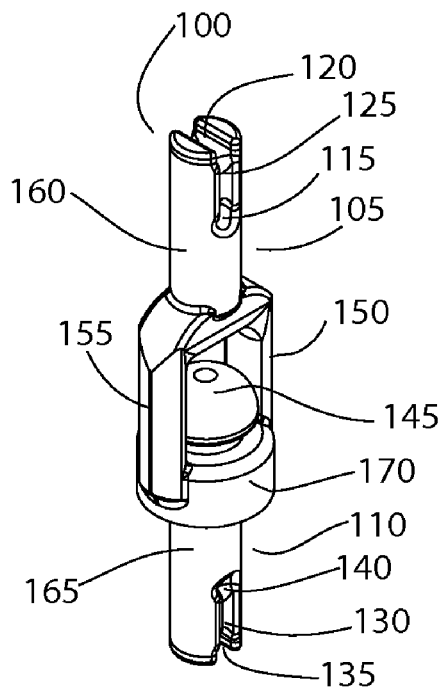
FIG. 3 shows a first perspective view an exemplary transparent swivel assembly according to principles of the invention.
Figure 4:
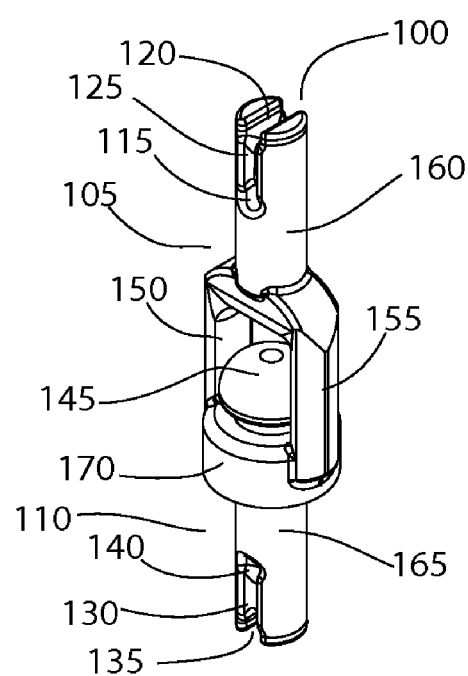
FIG. 4 shows a second perspective view an exemplary transparent swivel assembly according to principles of the invention.
Figure 5:
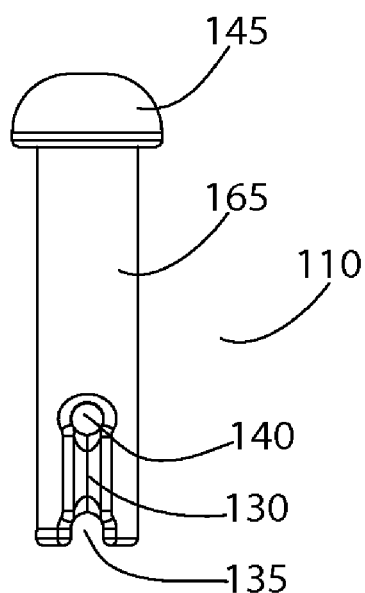
FIG. 5 shows a front view of an exemplary pin assembly for an exemplary transparent swivel assembly according to principles of the invention.
Figure 6:
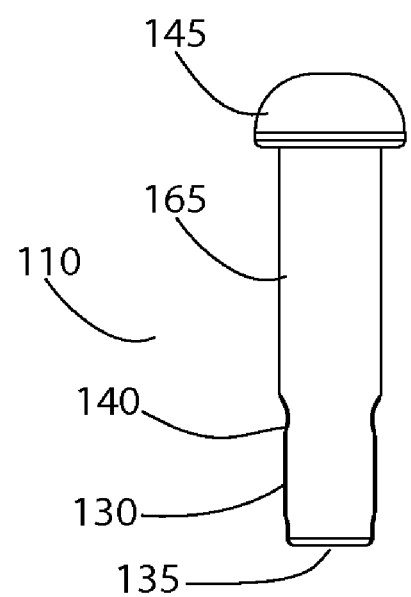
FIG. 6 shows a side view of an exemplary pin assembly for an exemplary transparent swivel assembly according to principles of the invention.
Figure 7:
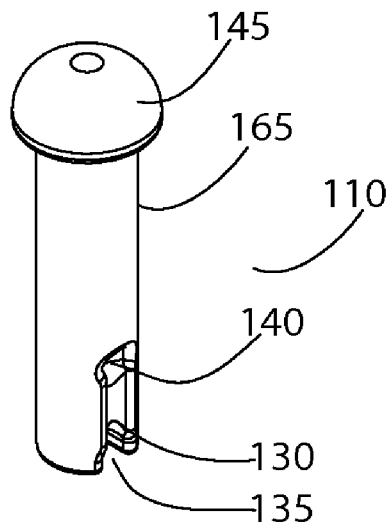
FIG. 7 shows a first perspective view of an exemplary pin assembly for an exemplary transparent swivel assembly according to principles of the invention.
Figure 8:
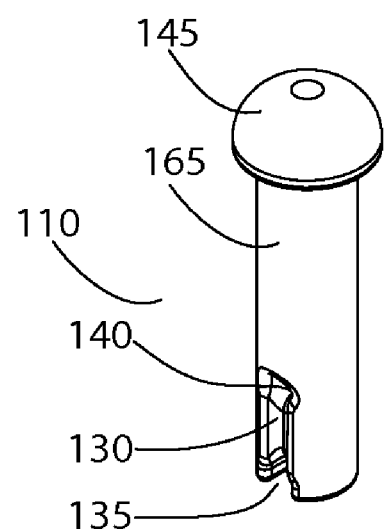
FIG. 8 shows a second perspective view of an exemplary pin assembly for an exemplary transparent swivel assembly according to principles of the invention.

Referring to FIGS. 5 through 8, the pin assembly 110 includes a head 145 at the proximal end. The head is attached to a neck 165. The neck 165 terminates at the distal end 135 with a line eyelet 140 and guide 130. The neck 165 is preferably cylindrical and has a diameter that is less than the diameter of central aperture 175 (as shown in FIGS. 7 and 8) of the engagement collar 170 of the shackle assembly 105. Thus, the neck 165 may extend through the aperture 175 of the collar 170. Concomitantly, the head 145 has a diameter that is larger than the aperture 175 of the collar 170. Thus, the head cannot pass through the aperture 175 under normal conditions of use. Twisting of a line connected to the pin assembly 110, therefore may cause the pin assembly to rotate relative to the shackle assembly 105.

Figure 9:
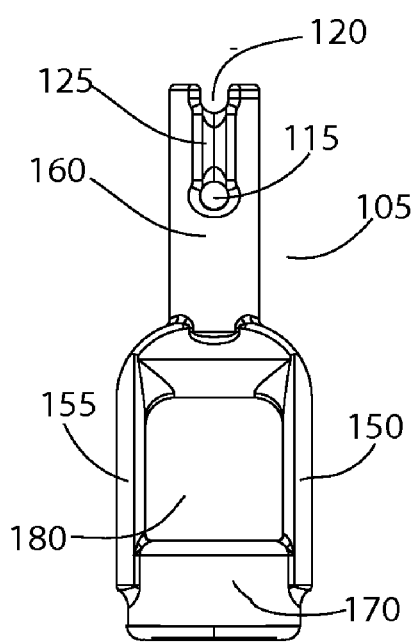
FIG. 9 shows a front view of an exemplary swivel body (referred to as a shackle assembly) for an exemplary transparent swivel assembly according to principles of the invention.
Figure 10:
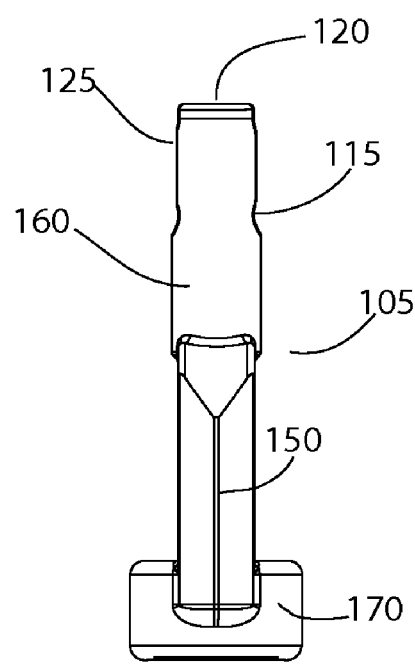
FIG. 10 shows a side view of an exemplary shackle assembly for an exemplary transparent swivel assembly according to principles of the invention.
Figure 11:
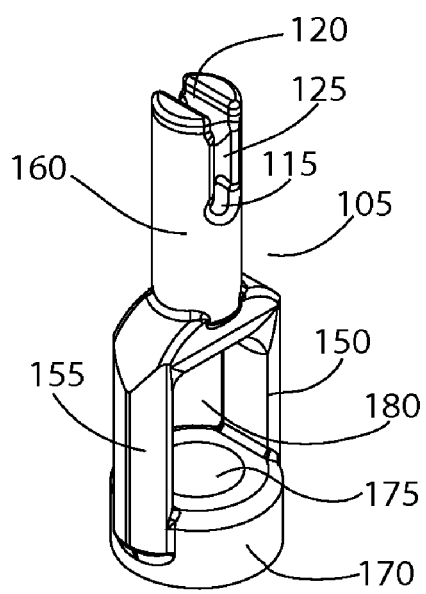
FIG. 11 shows a first perspective view of an exemplary shackle assembly for an exemplary transparent swivel assembly according to principles of the invention.
Figure 12:
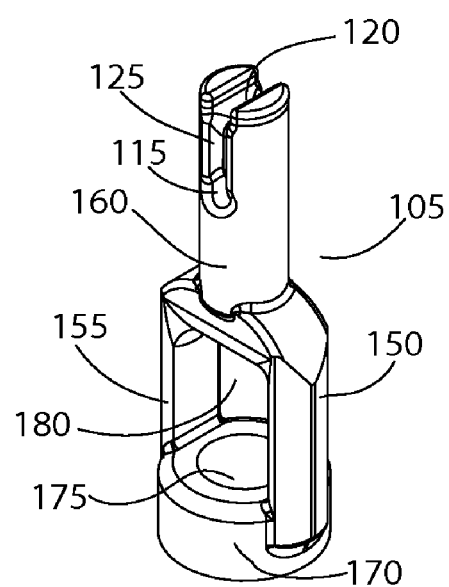
FIG. 12 shows a second perspective view of an exemplary shackle assembly for an exemplary transparent swivel assembly according to principles of the invention.

The shackle assembly 105, as shown in FIGS. 9 through 10 includes a collar 170, with a central aperture 175 extending through the collar 170. A fork having a plurality of prongs (i.e., projections) 150, 155 secures the collar to the neck 160 and defines a cavity 180 for receiving the head 145 of the pin assembly 165. The cavity 180 is sufficiently spacious to house the head 145 without interfering with rotation of the head 145. The neck 160 terminates at the distal end 120 with a line eyelet 115 and guide 125. Twisting of a line connected to the shackle assembly 105, therefore may cause the shackle assembly 105 to rotate relative to the pin assembly 110.

The shackle assembly 105 and pin assembly may be manufactured as separate parts and then assembled prior to use. As shown in FIG. 13, assembly entails guiding the distal end of the pin 110 into the aperture 175 of the collar 170. Then the neck 165 of the pin 110 is urged into the aperture 175, until the head 145 of the pin resists further advancement. A sequence of installation steps is schematically illustrated as steps A, B and C in FIG. 13.

Of significance, the eyelets 115, 1140, guides 125, 130 and distal ends 120, 135 define a stationary pulley-shaped mechanism to which lines may be securely fastened. This configuration helps maintain the lines approximately centered, between the sides of the mechanism. The configuration also distributes stresses from tensile forces transmitted through the lines. Furthermore, this configuration helps to maintain structural integrity.

Now with reference to FIGS. 14 and 16, an exemplary snap swivel 200 according to principles of the invention includes a pliable band 210 attached at one end to a plug 205 and at the opposite end to the top 215 of a first barrel 230. The first barrel includes a socket 235 with engagement protuberances 225, 240 along the interior wall of the socket 235 to receive and releasably secure the plug 205 in the socket 235. When the plug 205 is inserted into the socket 235, the pliable band 220 forms a loop, to which a fishing line, lure, or other hardware may be releasably attached.

A second barrel 260 is coupled to the first barrel 230 by one or more supports 245, 255. The second barrel includes a central aperture 280, through which the neck 285 of a swivel coupling 275 passes. The aperture may be filleted or beveled to maximize the range of pivoting motion of the coupling 275. A head 250, e.g., a hemispherical head 250, having a larger diameter than the aperture 280, is attached to the neck 285 to prevent the coupling 275 from disengaging the second barrel 260. A clasp 265 that is permanently closed or capable of being opened is attached to the end of the neck 285 opposite the head 250. In the case of a clasp 265 capable of being opened, one arm 270 of the clasp may releasably engage the neck 285.

In use, a line from a rod and reel may be tied to one attachment means, i.e., either the coupling 265 or the loop formed by the pliable band 220 when the plug 205 is inserted into the socket 235. A length of terminal fishing line terminated by a hook, lure or sinker, may then be tied to the opposite attachment means. Twisting of either the terminal line or the line from the rod and reel causes the coupling 275 to rotate relative to second barrel 260, thus preventing tangling. The filleted aperture 280 allows a wide range of pivoting motion of the coupling 275. The plug 205 may be disengaged from the corresponding socket 235, to release the line engaged thereto.

With reference to FIGS. 16 and 17, an exemplary barrel swivel 300 according to principles of the invention includes a toroidal eyelet 305 attached to the top end of a barrel 330 by one or more supports 315, 320. The barrel 330 includes a central aperture 360, through which the neck 355 of a swivel coupling 350 passes. The aperture 360 may be filleted or beveled to maximize the range of pivoting motion of the coupling 350. A head 325, e.g., a hemispherical head 325, having a larger diameter than the aperture 360, is attached to the neck 355 to prevent the coupling 350 from disengaging the second barrel 330. A clasp 340 that is permanently closed or capable of being opened is attached to the end of the neck 355 opposite the head 325. In the case of a clasp 340 capable of being opened, one arm 345 of the clasp may releasably engage the neck 355.

In use, a line from a rod and reel may be tied to one attachment means, i.e., either the eyelet 305 or the coupling 350. A length of terminal fishing line terminated by a hook, lure or sinker, may then be tied to the opposite attachment means. Twisting of either the terminal line or the line from the rod and reel causes the coupling 350 to rotate relative to the barrel 330, thus preventing tangling. The filleted aperture 360 allows a wide range of pivoting motion of the coupling 350.

With reference now to FIGS. 18 and 19, an exemplary three-way swivel 400 according to principles of the invention includes a frame 430, such as a polygonal (e.g., pentagonal) frame. The frame 450 includes a three apertures 470, 475, 480, through which the neck 415 of a swivel coupling 440, 450, 460 passes. Each of the apertures 470, 475, 480 may be filleted or beveled to maximize the range of pivoting motion of the engaged coupling 440, 450, 460. A head 410, e.g., a hemispherical head 410, of each coupling 440, 450, 460, having a larger diameter than the corresponding aperture 470, 475, 480, is attached to the neck 455 of each coupling 440, 450, 460 to prevent the coupling 440, 450, 460 from disengaging the frame 430. A clasp 420 that is permanently closed or capable of being opened is attached to the end of the neck 415 opposite the head 410. In the case of a clasp 420 capable of being opened, one arm 425 of the clasp may releasably engage the neck 415.

In use, a line from a rod and reel may be tied to one attachment means, i.e., any one of the couplings 440, 450, 460. Lengths of terminal fishing lines terminated by a hook, lure or sinker, may then be tied to the other attachment means. Twisting of either the terminal line or the line from the rod and reel causes the corresponding coupling 440, 450, 460 to rotate relative to the frame 430, thus preventing tangling. The filleted apertures 470, 475, 480 allows a wide range of pivoting motion of the couplings 440, 450, 460.

Now that the structure of the exemplary swivels have been described, the composition will be discussed. An important aspect of a swivel according to principles of the invention is optical characteristic, particularly transparency in water. Preferably, the swivel is not appreciably more visible in water than transparent fishing line. Such optical property is referred to herein as transmissive or substantial transparency, and it ranges from fully transparent to translucent when the material is immersed in water. The material may be dyed or otherwise tinted to further resemble the color of the water. Thus, the swivel will be invisible or difficult to discern in the water, and will not materially detract from the invisibility of the line.

The refractive index (or index of refraction) of the chosen material, which is the ratio of the velocity of light in a vacuum to its velocity in the material, should preferably be nearly the same as the refractive index for water. The refractive index is also the ratio of the sine of the angle of incidence to the sine of the angle of refraction. ASTM D542-00, ISO 489. Light rays change direction when they cross the interface from water to the material, with the change being proportional to the difference in refractive indices. Light also reflects partially from surfaces that have a refractive index different from that of their surroundings. The refractive index of freshwater is about 1.30 while that of saltwater may be about 1.35. The more similar the refractive index of a material is to that of water, the more difficult the material is for fish to see. The closer the material's refractive index is to that of water, the more it will blend in with the surrounding water, making it nearly invisible.

Preferably, the material exhibits a high degree of transmittance in water, density greater than that of water, an ultimate tensile strength sufficient for a small embodiment to withstand the loads exerted during fishing, and adequate rigidity to withstand appreciable deformation while loads are exerted. Materials with a refractive index less than 1.55, a specific gravity greater than 1.0, an ultimate tensile strength greater than 1,000 psi, and a tensile elastic modulus greater than 10,000 psi are preferred.

The terms "optical clarity" and the equivalent term "optically clear" are difficult to define, and the boundaries between "transparent" or "clear" and "translucent" or "opaque" are often highly subjective. It is possible to measure the degree of light transmission using ASTM D-1003 (Standard Test Method for Haze and Luminous Transmittance of Transparent Plastics). Luminous transmittance is a measure of the amount of light that passes through a sample. As a general rule, luminous transmittance (i.e., light transmission) percentages over 85% are considered to be "transparent" and light transmission percentages of at least 75% are considered to be "substantially transparent". The perceived transparency or optical clarity is dependent on the thickness of the sample used for assessment, and the optical clarity will decrease with increasing thickness. Optical clarity may be achieved when the refractive index is constant through the material in the viewing direction. Areas of opaque material (such as colorants) or areas of different refractive index, will result in a loss of optical clarity due to refraction and scattering. Optical clarity also depends upon surface reflections from the sample. Surface reflections can come from two basic causes: specular reflection, which is the normal reflection from a smooth surface, and diffuse reflection, which is dependent on the surface flatness of the sample. The transmission loss as a result of surface roughness or embedded particles is more often termed "haze", and this is generally a production concern and not a property of the material.

Polyvinylidene Fluoride (PVDF), known in the fishing industry as fluorocarbon, is a particularly preferred material for its refractive index as low as about 1.42, which is similar to that of water and as a result less easily discernable by and less visible to fish. Concomitantly, PVDF is strong and rigid, with an ultimate tensile strength from 4,500-6,200 psi and a tensile elastic modulus (Young's Modulus) of about 160,000 psi. Furthermore, with a specific gravity of 1.77, its density is greater than that of water, meaning it will sink. The surface is relatively hard, so it is resistant to sharp fish teeth and wear. Furthermore PVDF doesn't take up water and it is resistant to UV-light. Moreover, PVDF is resistance to solvents and features a relatively low melting point of around 177° C., thereby facilitating thermoplastic manufacturing techniques.

Copolymers of PVDF offer similar advantageous properties and are also intended to come within the scope of the invention. Other suitable materials include Nylon, Nylon 6, Nylon 66, Nylon 9, Nylon 5, Nylon 10, Polycarbonate, Synthetic Polymers, Thermoplastics, Polyamide, Copolyamide, Copolymers of Nylon, Polyethylene, Thermoplastic Fluoropolymer and Fluoropolymers. Copolymers of any of the foregoing may also be used and come within the scope of the invention. Other polymeric compositions that are now known or hereafter developed and have suitable physical and optical properties may also be used in accordance with the present invention. Nonlimiting examples of suitable commercially available polymers for a fishing swivel according to principles of the invention are (1) UBE PA6/66 Copolymer, Grade 5023UW by UBE Engineering Plastics, S.A., which is a Nylon 66/6 (Polyamide 66/6 Copolymer) plastic; (2) NYCOA Polyamide 2237 by Nycoa (Nylon Corporation of America), a Nylon 6 (Polyamide 6) plastic material; and (3) TPU-1065D thermoplastic polyurethane. NYCOA Polyamide 2237 is particularly preferred for its optical clarity and strength.

Advantageously, light passes through a swivel according to principles of the invention, making it more difficult to detect than an opaque object. Transparency, the material property of allowing light to pass through, is preferred. However, materials that are tinted and translucent materials that allow light to pass through them only diffusely, may be used and are also intended to come within the scope of the invention. For convenience of reference, such materials that allow passage of light, whether unimpeded, diffuse, or tinted, are referred to collectively herein as transmissive. Transmittance is the ratio of the intensities of emitted light to incident light for a specified wavelength a material. The more light that a material absorbs, the lower its transmittance will be. As used herein, a transmissive material allows passage of an appreciable intensity of light.

The swivel may be produced using any suitable manufacturing techniques known in the art for the chosen material, such as (for example) injection, compression, structural foam, blow, or transfer molding; polyurethane foam processing techniques; vacuum forming; casting; milling; extrusion and pultrusion. Preferably the manufacturing technique is suitable for mass production at relatively low cost per unit, and results in an aesthetically acceptable product with a consistent acceptable quality and structural and optical characteristics.

In a particular preferred implementation, the swivel components are injection molded. The polymeric material can be injection-molded in plunger or ram-type injection molding equipment, but a screw machine is preferred. The raw material is fed into a plastication unit which mixes and melts the polymer and any additives, and homogenizes, pressurizes, and feeds the melt to a transfer section through a check valve. Plastication takes place at elevated temperatures (200° C.-400° C.) depending on the type of the plastic. Polyvinylidene fluoride is injection-molded at the low end of the temperature range while other polymers may be processed at the higher temperatures. The melt is forced through a nozzle into a mold cavity where it cools and hardens to the configuration of the mold cavity.

Uniquely, the injection molded parts are rapidly cooled to result in transparency. After injection molding, the mold is immediately cooled by exposure to a coolant such as water. The mold may be immersed or doused and/or coolant may be circulated through channels in the mold to achieve rapid and even cooling, although other cooling means may be used as well. By way of example and not limitation, mold chillers may be used. The molded material is rapidly cooled from an injection temperature of greater than about 230° C. to approximately room temperature. The molded parts are maintained in the mold during cooling. Cooling is done rapidly under conditions that avoid hazing of the PVDF material and to facilitate proper release from the mold. If the cooling rate is too slow (or if the molded parts are not sufficiently cool when exiting the mold), phase separation and resultant hazing can occur. By following the foregoing procedure, optically clear, i.e., highly transparent, or at least highly translucent, components can be produced.

PVDF exhibits optical clarity (i.e., it is transparent to translucent) when the hot injection molded polymer is rapidly cooled (e.g., quenched in water or cooled using a mold chiller) to minimize crystallization. Fast cooling (e.g., quenching or mold chilling) at the end of the injection molding process reduces crystalline content and increase amorphous content. When no colorant is used, amorphous plastics tend to be optically clear. In contrast, the presence of crystallites in crystalline plastics tends to compromise optical clarity.

The material may further include additives to provide desired properties such as desired colors, structural characteristics, glow-in-the dark properties and thermal reactivity (e.g., color changes according to heat). Any pigments, dyes or other colorants may be added to the material to achieve an aesthetically pleasing color or a color that is less detectable in certain waters. For example, certain waters, because of sediment, algae and/or other conditions, may have a greenish, bluish or reddish hue that can be simulated in the swivel using pigments, dyes or other colorants known in the plastics manufacturing arts.

By way of example and not limitation, the material may optionally be formulated to change color when it reaches a predetermined or higher temperature. This can be accomplished by mixing a thermochromic additive to the base material in an amount that is sufficient to achieve a desired color changing range. As an example, a mixture of approximately 5% to 30% (pbw) of Matsui International Co., Inc.'s Chromicolor® concentrate may be introduced to the base material, to provide a plastic structure that visibly changes color at a determined elevated temperature.

Alternatively, a photochromic additive may be added to the material in an amount that is effective to achieve a desired color change when the material is exposed to certain lighting conditions. As an example, a mixture of approximately 5% to 35% (pbw) of Matsui International Co., Inc.'s Photopia® additive may be introduced to the base material, to provide a plastic structure that visibly changes color in the presence of sunlight or ultraviolet light.

As another alternative, phosphorescent polymer additives, such as aluminate based phosphors, may be added to adsorb light energy and continue to release that energy as visible light after the energy source is removed, thus providing a glow-in-the-dark effect. Advantageously, such an embodiment provides a swivel that is easy to locate in darkened conditions, making the swivel easy to spot even at nighttime.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A two-piece fishing swivel comprising an integral swivel body and an integral pin body,
    said swivel body comprising a first neck having a distal and proximal end, a collar, a means for attaching the collar to the proximal end of the first neck, a means for attaching a line to the distal end of the first neck;
    said pin body comprising a second neck having a distal and proximal end, a head at the proximal end of the second neck, a means for attaching a line to the distal end of the second neck;
    said distal end of said second neck, including the means for attaching a line to the distal end of the second neck, being sized to slide through the collar and being removably inserted through the collar, and said second neck, between the distal and proximal ends, being rotatably and removably engaged by the collar, and said head preventing the proximal end of the second neck from passing through the collar; and
    said fishing swivel consisting of a polymeric material that is substantially transparent when said material is immersed in water, said polymeric material comprising injection molded fluorocarbon that has been rapidly cooled to reduce haziness and enhance luminous transmittance upon post-injection molding solidification.

2. A fishing swivel according to claim 1, said substantially transparent material being a dyed material.

3. A fishing swivel according to claim 1, said polymeric material having a refractive index less than 1.55, a luminous transmittance greater than 75%, a specific gravity greater than 1.0, and an ultimate tensile strength greater than 1,000 psi.

4. A fishing swivel according to claim 1, said substantially transparent material being a translucent material.

5. A fishing swivel according to claim 1, said collar having a central aperture with a first diameter, and said head having a head diameter greater than the first diameter.

6. A fishing swivel according to claim 1, said collar having a central aperture with a first diameter, and said second neck having a second diameter less than the first diameter.

7. A fishing swivel according to claim 1, said means for attaching the collar to the proximal end of the first neck comprising a fork, said fork comprising a pair of spaced apart parallel prongs, each prong extending from the neck to the collar.

8. A fishing swivel according to claim 1, said means for attaching the collar to the proximal end of the first neck comprising a fork, said fork comprising a plurality of spaced apart parallel prongs, each prong extending from the neck to the collar.

9. A fishing swivel according to claim 1, said means for attaching a line to the distal end of the first neck comprising an eyelet formed in the distal end of the first neck.

10. A fishing swivel according to claim 1, said means for attaching a line to the distal end of the first neck comprising an aperture extending through the first neck.

11. A fishing swivel according to claim 1, said means for attaching a line to the distal end of the first neck comprising an aperture with finished edges, said aperture extending through the first neck.

12. A fishing swivel according to claim 1, said means for attaching a line to the distal end of the second neck comprising an aperture extending through the second neck.

13. A fishing swivel according to claim 1, said means for attaching a line to the distal end of the second neck comprising an aperture with finished edges, said aperture extending through the second neck.

14. A two-piece fishing swivel comprising an integral swivel body and an integral pin body rotatably coupled to the body, said fishing swivel consisting of a substantially transparent injection molded plastic material, said plastic material comprising injection molded fluorocarbon that has been rapidly cooled to reduce haziness and enhance luminous transmittance upon post-injection molding solidification;
    said swivel body having a distal end, a proximal end and a shaft extending from the distal end to the proximal end, said distal end including an aperture through which a line may be attached and a pulley-shaped terminus abutting said aperture, said pulley-shaped terminus being in the shape of an elliptical hyperboloid, and said swivel body further comprising a collar and a fork attaching the collar to the proximal end of the shaft, said fork comprising a plurality of arms, each arm extending from the proximal end of the shaft to the collar, and said collar comprising a sleeve with a distal collar end, a proximal collar end, and a central passage, said central passage having a circular cross section, extending axially through the sleeve from the distal collar end to the proximal collar end and having a collar inner diameter; and
    said pin body comprising a head defining proximal end of the pin body and having a width that is greater than the collar inner diameter, a shank having a circular cross section and a shank outer diameter that is not greater than the collar inner diameter, an aperture extending through said shank at a distal end of said pin body through which a line may be attached, a pulley-shaped terminus abutting said aperture, said pulley-shaped terminus being in the shape of an elliptical hyperboloid and defining a distal end of the pin body, and the collar surrounding a portion of the shank, and the head of the pin body abutting the proximal collar end, and the pulley-shaped terminus disposed apart from the distal collar end.

15. A fishing swivel according to claim 14, said material having a refractive index less than 1.55, and a specific gravity greater than 1.0, and a luminous transmittance greater than 75%.

16. A fishing swivel according to claim 14, said material having a refractive index less than 1.55, a luminous transmittance greater than 75%, and an ultimate tensile strength greater than 1,000 psi.

17. A fishing swivel according to claim 14, said material having a refractive index less than 1.55, a luminous transmittance greater than 75%, and a tensile elastic modulus greater than 10,000 psi.

18. A fishing swivel according to claim 14, said plastic material comprising
    Polyvinylidene Fluoride.

19. A fishing swivel consisting of a swivel body and a pin body, said swivel body comprising a first neck having a distal and proximal end, a collar, a means for attaching the collar to the proximal end of the first neck, and a means for attaching a line to the distal end of the first neck;

said pin body comprising a second neck having a distal and proximal end, a head at the proximal end of the second neck, and a means for attaching a line to the distal end of the second neck;

said second neck being rotatably engaged by and extending through the collar; and said fishing swivel consisting of a substantially transparent, injection molded, and rapidly cooled fluorocarbon plastic having a luminous transmittance greater than 75% and a refractive index less than 1.55, said rapidly cooled fluorocarbon plastic comprising fluorocarbon plastic that has been rapidly cooled with water after injection into an injection mold;

said collar having a central aperture with a first diameter, and said head having a head diameter greater than the first diameter, and said second neck having a second diameter less than the first diameter;

said means for attaching the collar to the proximal end of the first neck comprising at least one projection extending from the neck to the collar, and said means for attaching a line to the distal end of the first neck comprising an aperture extending through the distal end of the first neck, and said means for attaching a line to the distal end of the second neck comprising an aperture extending through the second neck.

* * * * *